F. G. NICOLAUS AND J. ROY.
COMBINED GAS AND COAL RANGE.
APPLICATION FILED MAR. 31, 1921.
1,420,495.
Patented June 20, 1922.
2 SHEETS—SHEET 1.
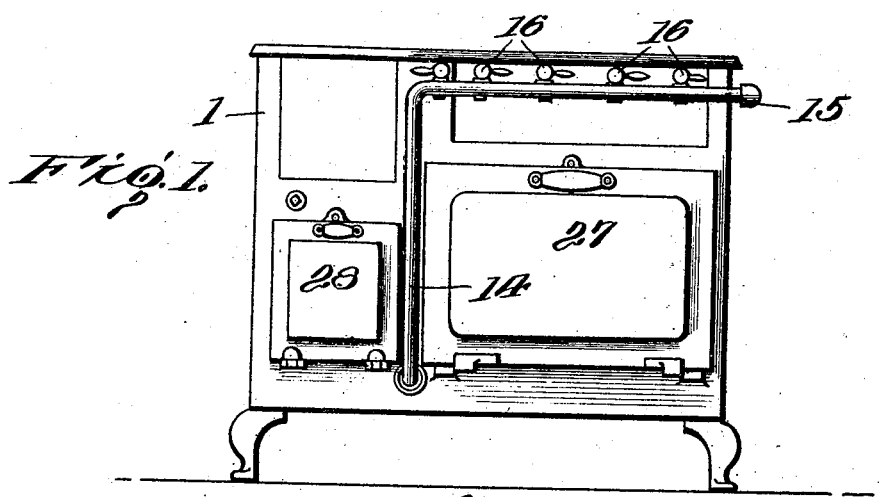
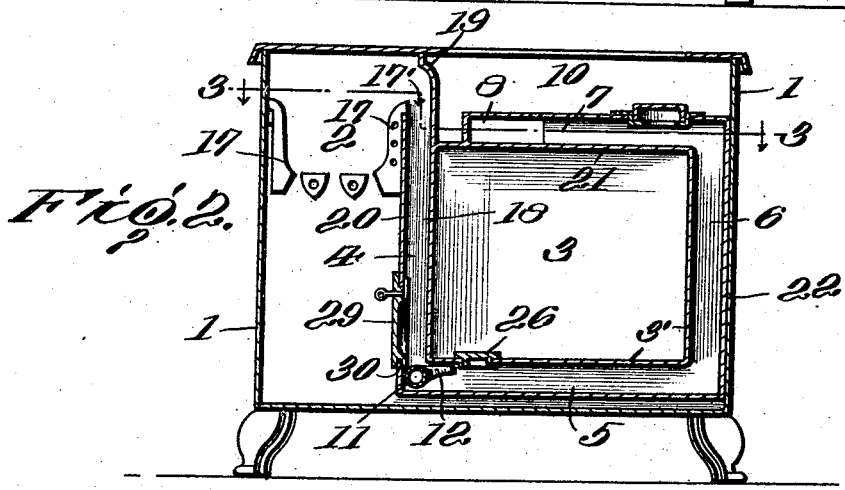
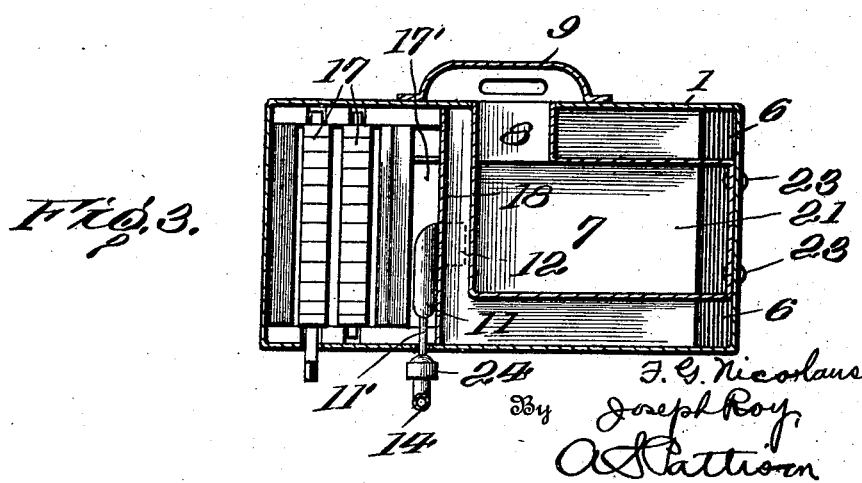
Inventors.
F. G. Nicolaus,
Joseph Roy,
By A. S. Pattison
Attorney F. G. NICOLAUS AND J. ROY.
COMBINED GAS AND COAL RANGE.
APPLICATION FILED MAR. 31, 1921.
1,420,495.
Patented June 20, 1922.
2 SHEETS—SHEET 2.
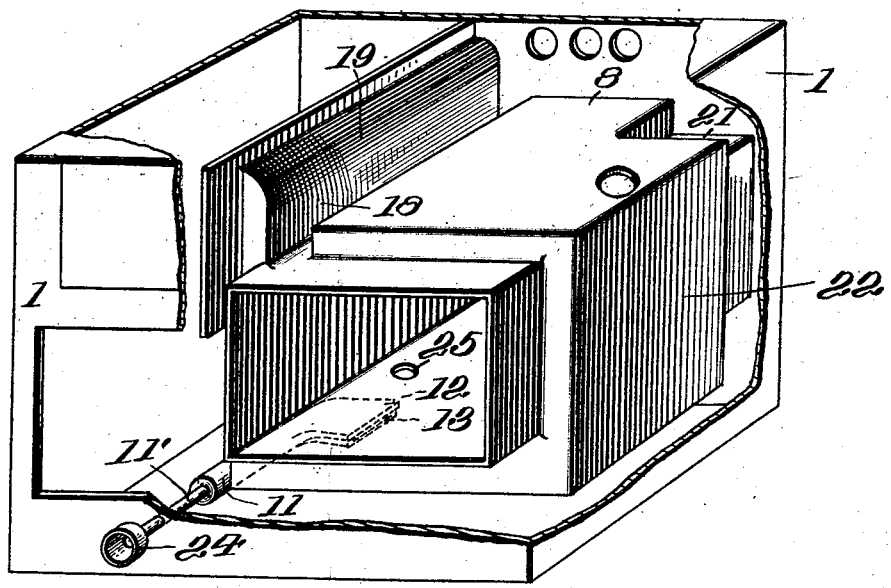
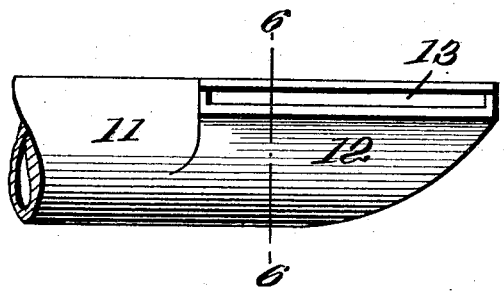
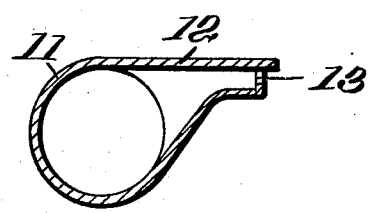

UNITED STATES PATENT OFFICE.

FREDERIC G. NICOLAUS AND JOSEPH ROY, OF CLEVELAND, OHIO, ASSIGNORS TO AMERICAN STOVE COMPANY, OF ST. LOUIS, MISSOURI, A CORPORATION OF NEW JERSEY.

COMBINED GAS AND COAL RANGE.

1,420,495.  Specification of Letters Patent.  Patented June 20, 1922.

Application filed March 31, 1921. Serial No. 457,376.

*To all whom it may concern:*

Be it known that we, FREDERIC G. NICOLAUS and JOSEPH ROY, citizens of the United States, residing at Cleveland, in the county of Cuyahoga and State of Ohio, have invented certain new and useful Improvements in Combined Gas and Coal Ranges, of which the following is a specification, reference being had therein to the accompanying drawing.

This invention relates to improvements in combined gas and coal ranges, and more particularly to an improvement over our Patent Number 1,363,905, in which patent the gas burner is positioned at the junction of the fire-pot with the downwardly extending oven surrounding flue.

In this improved and novel arrangement, the gas burner is positioned at the lower end of the vertical flue separating the fire-pot and the oven and extends slightly beneath the oven bottom.

This location of the gas burner has been found to be desirable in that with a burner located as in our Patent 1,363,905, we found it necessary to insulate the oven side nearest the burner with so much insulation in order to make an even baking oven when the gas burner was used, that the gas consumption was excessive. In addition, added insulation on the oven side made a slow heating oven when the coal fire alone was used. Also with a burner located in the upper position, as in our patent referred to, it was found that the lighting of the burner was awkward.

With the burner located as shown in our present improvement, the oven side insulation on the coal fire-box side, is sufficient only to properly insulate the oven when coal is used, therefore providing an oven which is more quickly heated and more efficient when the coal fire only is used. In addition with the gas burner located in the lower position, the oven bottom receives heat direct, which raises the heat in the oven to the desired point quickly and with a smaller consumption of gas than in the case of the burner located in the elevated position. The change of the position of the burner from the elevated position to that at the bottom of the flue below the oven, does not in any way change the range in the combined use of coal and gas as a heating instrument.

The primary object of this invention is to provide a combined gas and coal range, wherein the gas burner is so located that no additional insulation is necessary to the oven walls.

A further object of this invention is to provide a combined coal and gas range in which the oven is quickly heated when either coal or gas separately or the two combined are used as the heating element.

A still further object of this invention is to provide a combined gas and coal range wherein the gas burner is located so as to be easily lighted and readily removed for the purpose of cleaning the burner.

Other and further objects of the invention will appear in the following annexed specification and the accompanying drawings.

In the drawings:

Figure 1 is a front elevation of a combined coal and gas range embodying our invention.

Fig. 2 is a vertical sectional view through Fig. 1.

Fig. 3 is a horizontal sectional view taken on the line 3—3 of Fig. 2.

Fig. 4 is a perspective view showing the range housing broken away, the oven and gas burners therein in perspective.

Fig. 5 is a detached fragmental inverted plan view of the burner.

Fig. 6 is a transverse sectional view of the burner taken on the line 6—6 of Fig. 5.

Referring now to the drawings, 1 is a range housing containing a fire-pot 2 and an oven 3. In our improved construction, we provide a downwardly extending flue 4, which is located between the fire-pot 2 and the oven 3, thus spacing the two apart. The flue 4 is continuous around the oven 3 by a horizontal extension 5, thereof, and thence upward behind the oven by the extension flue 6, and thence forward over the top of the oven by its horizontal extension 7, which has its forward end in communication with an outward flue opening 8, which in turn communicates with the chimney flue 9. This arrangement provides a top burner receiving space 10, in which the usual four top burners (not shown) are placed. This arrangement, it will be further observed, provides a space for the top burners within the rectangular range housing 1, without any lateral extension which is provided in the usual flue arrangement to accommodate the top gas burners.

At the bottom of the downwardly extending flue 4, and at its juncture with its horizontal extension flue 5, is positioned a suitable gas burner 11, having a horizontally extending portion 12 in the end of which is a gas outlet or slit 13. A gas supply 14 communicates with the burner 11. This gas-supply receives its gas from a suitable manifold 15, which also supplies gas to the four top burners (not shown) through controlling valves 16.

The fire-pot is provided with any suitable form of grate 17, and is in communication with the downwardly extending flue 4, by means of the flue passage 17'.

The inner wall of the flue 4 is formed by the adjacent wall 18, of the oven 3, and this wall extends upward above the oven to the top of the range, as at 19, and thus closing the forward end of the flue 7 and forming a closed flue wall from the top of the range frame to the bottom of the oven. The outer walls of the flue 4 and extension 5 are formed by a casing 20, and the upper or outer wall of the portion 7 of the flue is formed by a suitable horizontal wall 21, the oven wall forming the inner and lower walls 3' of the flue extensions 5, 6 and 7.

By means of our improvement, we are able to provide a combined coal and gas range of a very simple construction, which, in practice is found to be effective for rapid heating and also economical in space occupied thereby.

Referring now particularly to Fig. 4, it will be seen that the flues 5 and 7 pass around the oven, and that the ends 20 and 21 of the oven project beyond the walls of the flues 5, 6, and 7.

The end wall 22 is bolted or riveted to the adjacent wall of the range housing 1, as shown at 23 in Fig. 3.

Where the gas supply pipe 14 joins the burner pipe extension 11', there is the usual or common type of gas and air mixer 24. Attention is directed to the fact that although the burner 11 proper is at the junction of the flue 4 with its horizontal extension flue 5, the flame and heat from the burner will be directed against the bottom of the oven.

Positioned in the bottom 3' of the oven 3, and at a point above the extending end 12 of the burner is an opening 25 provided with a suitable covering 26, and the burner is readily and easily lighted through this opening.

Access to the oven is had through the door 27, and access to the burner pot and gate is had through the door 28, both of which are in the range front.

A door 29, constructed to be readily and easily removed, is provided to cover the opening 30 in the wall 20 of the flue 4, and access to the burner 11 is had through this door and opening. If desired, the burner can be cleaned through this opening, or, if preferred, the burner can be removed through the opening and cleaned thoroughly after its removal.

Having thus described our invention, what we claim and desire to secure by Letters Patent is:—

1. A combined coal and gas range comprising a housing, a fire-pot therein, an oven within the housing and spaced apart from the fire-pot forming a downwardly extending flue communicating at its upper end with the fire-pot, said flue extending around the oven and communicating at its upper end with a chimney flue, a burner having an elongated end located adjacent the bottom of the downwardly extending flue with its elongated end extending beneath the oven bottom, and a gas burning slit located in the end wall of the extending end of the burner and adapted to direct the flame across the bottom of the oven, for the purpose described.

2. A combined coal and gas range of the character described, comprising a fire-pot and an oven, a flue separating the oven from the fire-pot, a flue surrounding the oven and communicating with a chimney, a gas burner having an elongated end with a gas burning slit therein located at the bottom of the flue between the fire-pot and the oven, the oven and flue walls of a thickness to properly insulate the oven when there is a fire in the fire-pot, an opening in the oven bottom above the gas burner, an opening adjacent the gas burner in the fire-pot insulating flue wall, and a gas burner constructed to direct its flame against the oven bottom, whereby a quickly heating oven is provided.

3. A combined coal and gas range comprising a housing, a fire-pot therein, an oven within the housing and spaced apart from the fire-pot to form a downwardly extending flue communicating at its upper end with the fire-pot only, said flue having a continuation extending around the oven and communicating with a chimney flue, a burner having an elongated end located adjacent the bottom of the downwardly extending flue with its extending end beneath the oven bottom, and a gas burning slit located in the end wall of the extending end of the gas burner, whereby the flame is directed across the bottom of the oven, for the purpose described.

In testimony whereof we hereunto affix our signatures.

FREDERIC G. NICOLAUS.
JOSEPH ROY.